United States Patent
Mlinar et al.

[11] Patent Number: 5,976,316
[45] Date of Patent: Nov. 2, 1999

[54] NON-NODAL MOUNTING SYSTEM FOR ACOUSTIC HORN

[75] Inventors: John R. Mlinar, Coon Rapids; Donald S. Oblak, North St. Paul, both of Minn.

[73] Assignee: 3M Innovative Properties Company, St. Paul, Minn.

[21] Appl. No.: 09/079,609

[22] Filed: May 15, 1998

[51] Int. Cl.⁶ .................................................. B29C 65/08
[52] U.S. Cl. .................................... 156/580.2; 156/580.1; 228/1.1; 310/323
[58] Field of Search .................... 156/73.1, 580.1, 156/580.2; 228/1.1, 110.1; 310/323

[56] References Cited

U.S. PATENT DOCUMENTS

| | | | |
|---|---|---|---|
| 3,752,380 | 8/1973 | Shoh | 228/1 |
| 3,863,826 | 2/1975 | Shoh | 228/1 |
| 3,955,740 | 5/1976 | Shoh | 228/1 |
| 4,647,336 | 3/1987 | Coenen et al. | 156/580.1 |
| 4,884,334 | 12/1989 | Houser et al. | 29/739 |
| 4,975,133 | 12/1990 | Gochermann | 156/73.1 |
| 4,995,938 | 2/1991 | Tsutsumi | 156/580.1 |
| 5,096,532 | 3/1992 | Neuwirth et al. | 156/580.1 |
| 5,385,288 | 1/1995 | Kyomasu et al. | 228/1.1 |
| 5,464,498 | 11/1995 | McGrath | 156/580.2 |
| 5,468,336 | 11/1995 | Lotz et al. | 156/580.2 |
| 5,486,733 | 1/1996 | Yamazaki et al. | 310/323 |
| 5,707,483 | 1/1998 | Nayar et al. | 156/580.2 |
| 5,772,100 | 6/1998 | Patrikios | 228/1.1 |

*Primary Examiner*—James Sells
*Attorney, Agent, or Firm*—Charles D. Levine

[57] ABSTRACT

A non-nodal mounting system for an ultrasonic element includes a drive ring and a flexible disk. The drive ring is rotatably connected to a mounting housing. The flexible disk is fixed at a radially inner portion to the ultrasonic element and at a radially outer portion to the drive ring. The flexible disk can include flexible fingers for reducing the force transmitted to the drive ring. Also, the flexible disk can include an inner annular ring at the radially inner portion and a concentric annular ring at the radially outer portion. The rings are connected by the fingers.

15 Claims, 8 Drawing Sheets

NON-NODAL MOUNTING SYSTEM FOR ACOUSTIC HORN

TECHNICAL FIELD

The present invention relates to acoustic horns. More particularly, the present invention relates to mounting systems for acoustic horns.

BACKGROUND OF THE INVENTION

In acoustic welding, such as ultrasonic welding, two parts to be joined (typically thermoplastic parts) are placed directly below an ultrasonic horn. In plunge welding, the horn plunges (travels toward the parts) and transmits ultrasonic vibrations into the top part. The vibrations travel through the top part to the interface of the two parts. Here, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In continuous welding, typically the ultrasonic horn is stationary and the part is moved beneath it. Scan welding is a type of continuous welding in which the part moves. The plastic part is scanned beneath one or more stationary horns. In transverse welding, the part is stationary while the horn moves over it.

The horn is an acoustical tool made of, for example, aluminum, titanium, or sintered steel that transfers the mechanical vibratory energy to the part. Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the welding surface of the horn is coincident with the direction of the applied mechanical vibrations.

A rotary acoustic horn, like all horns, imparts energy at a selected wavelength, frequency, and amplitude. The rotary horn includes a shaft with input and output ends, and a welding portion mounted on and coaxial with the output end. The diameter of the welding portion is greater than the diameter of the shaft. The welding portion has a cylindrical weld face having a diameter that expands and contracts with the application of acoustic energy. Typically, a rotary horn is cylindrical and rotates around a longitudinal axis. The input vibration is in the axial direction and the output vibration is in the radial direction. The horn and anvil are close to each other, and the anvil can rotate in the opposite direction to the horn. The part to be bonded passes between these cylindrical surfaces at a linear velocity which equals the tangential velocity of these cylindrical surfaces. Matching the tangential velocities of the horn and the anvil with the linear velocity of the material is intended to minimize the drag between the horn and the material. The excitation in the axial direction is similar to that in conventional plunge welding.

U.S. Pat. No. 5,096,532 describes two classes of rotary horn. The patent compares a commercially available full wavelength rotary horn, manufactured by Mecasonic-KLN, Inc. of Fullerton, Calif. (Mecasonic horn) and a half wavelength rotary horn described in the '532 patent.

U.S. Pat. No. 5,707,483 discloses another type of rotary acoustic horn with undercuts.

There are typically two methods of mounting any ultrasonic horn, nodal and non-nodal mounting. A node is a portion of the horn that is not moving in one or more directions. With a nodal mount the horn can be held or grasped rigidly. Non-nodal mounts require some flexible elements because the horn surface is moving (vibrating). Because of the difficulties of handling the vibrations, non-nodal mounts are typically not used in the industry.

Nodal mounts typically have a flange machined at a node, shown in FIG. 1, or a series of set-screws positioned radially around the node shown in FIG. 2. U.S. Pat. No. 4,647,336 discloses a reparable nodal flange mount such as that of FIG. 1. In this design the flange at the nodal point of a booster has an O-ring above and below it. A two piece support collar clamps against the O-rings to support the assembly. (This is shown in FIG. 4 of the '336 patent). U.S. Pat. No. 4,995,938 discloses using the nodal flanges as pistons of an air or hydraulic cylinder. In this system, the method of supporting the booster and the method of applying the required welding force are combined, as shown in FIG. 1 of the '938 patent).

U.S. Pat. No. 5,486,733 discloses a nodal mount inside the converter. A machined ring is sandwiched between the piezoelectric crystals that are driving the horn. U.S. Pat. No. 4,975,133 includes a set-screw nodal mount for an ultrasonic booster. This design is used for rotary shear welding operation. RD 21128 discloses a method where a potting material is used instead of O-rings on a nodal flange type mounting.

Anti-nodes are areas of maximum displacement of a horn or booster. Attaching mounting systems at these locations or at other non-nodal locations requires the mount to be designed to isolate the vibration from base of the device.

U.S. Pat. No. 3,752,380 discloses using a pair of leaf springs located at the non-nodes of a non-rotating bar horn. U.S. Pat. No. 3,863,826 discloses a sonic or ultrasonic apparatus that uses a leaf spring support to mount a converter to a stationary support. These springs isolate the vibration and allow vertical motion with an air cylinder to accommodate the height of the parts being welded. This design is for a non-rotating horn. In both these patents, the leaf spring is sandwiched between the junction of the converter or booster and the horn. This interferes with the transmission of ultrasonic energy through the horn and limits the usefulness of rotary horns.

U.S. Pat. No. 3,955,740 discloses a non-nodal rotary horn mount which uses a solid metal diaphragm located in the junction between the booster and horn. The diaphragm is statically stiff, having a static stiffness of about $1.35 \times 10^7$ N/m (77,000 lb/in). Very high static loads are possible because the design uses a rotating tube to isolate this force from the bearings Also, in this design, the diaphragm is designed to resonate at the frequency of the horn. The diaphragm is an ultrasonic element. Similarly, U.S. Pat. No. 4,884,334 discloses a statically stiff disk or finger support which resonates at the frequency of the horn and is an ultrasonic element.

U.S. Pat. No. 5,468,336 discloses a flexural spring support for a shear welding apparatus. This design uses tapered support beams that allow a plate to be vibrated side-to-side while remaining parallel to the fixed plate. This side-to-side motion slides the parts being welded past each other and welds them together. This design is for a shear welding operation, uses taper beams, and could not be practically adapted to a rotary horn mounting situation. U.S. Pat. No. 5,464,498 discloses another flexural support spring method. This design is machined from a single piece of material.

A commercially available non-nodal mount for horns, shown in FIG. 3, was manufactured by American Technology, Inc. (Amtech), Shelton, Conn., and is used for shear welding. This unit has a plate with slots machined radially from the outer diameter to create fingers. The outer edge of the finger plate is mounted with a clamp ring while the inner fingers are clamped between the end of the horn and the booster.

SUMMARY OF THE INVENTION

A non-nodal mounting system for an ultrasonic element includes a drive ring and a flexible disk. The drive ring is rotatably connected to a mounting housing. The flexible disk is fixed at a radially inner portion to the ultrasonic element and at a radially outer portion to the drive ring. The flexible disk includes means for reducing the force transmitted to the drive ring.

The means for reducing the force can include fingers shaped to reduce the force transmitted to the drive ring or a solid circular disk of uniform or nonuniform thickness. The fingers can be long and slender, and have a length-to-width ratio of from 2 through 10, and a width-to-thickness ratio of from 2 through 20.

The flexible disk can also include an inner annular ring at the radially inner portion and a concentric outer annular ring at the radially outer portion which are connected by the fingers. An inner clamp ring can be connected to the inner annular ring and an outer clamp ring can be connected to the inner annular ring of the flexible disk.

If the ultrasonic element is a rotary horn and the rotary horn is connected to a booster, the flexible disk can be located outside of the junction of the horn and booster.

The mounting system can also include means for damping vibrations. This means can include high damping metals located between the flexible disk and the clamp ring and between the flexible disk and one of the ultrasonic element and drive ring. The high damping metals can be copper or lead.

The mounting system can also include a rotationally fixed mounting housing.

DETAILED DESCRIPTION

The invention is a non-nodal mounting system for an ultrasonic element. Non-nodal means any location that is not a node, including anti-nodes. An ultrasonic element is a part with a desired resonant (also known as operating) frequency that is driven at that resonant frequency. Ultrasonic elements include converters, which are power excitation devices; boosters, which modify the amplitude of a converter; and ultrasonic horns, such as rotary ultrasonic horns, which is the welding tooling that contacts a workpiece and can modify the amplitude from a converter. Other ultrasonic elements include horn support members that have a natural frequency near the operating frequency of the horn.

The mounting system includes a flexible fingered member. This member is shown and described as a circular disk. Especially for non-rotary horns, this flexible member can be other shapes. Because the disk does not resonate at the operating frequency of the horn, it is not an ultrasonic element. (It is fixed to an ultrasonic element, does not resonate, yet does not break!) The disk isolates the displacement of the horn (0.0025–0.0051 cm (0.001–0.002 in) at the horn's operating frequency, which in the illustrated embodiments is 20,000 Hz) from the support frame. The invention can be used to non-nodally mount any ultrasonic element. The non-nodal mounting system can be located at one or both ends of any ultrasonic element or at any location that does not interfere with the welding process.

Figure 4:
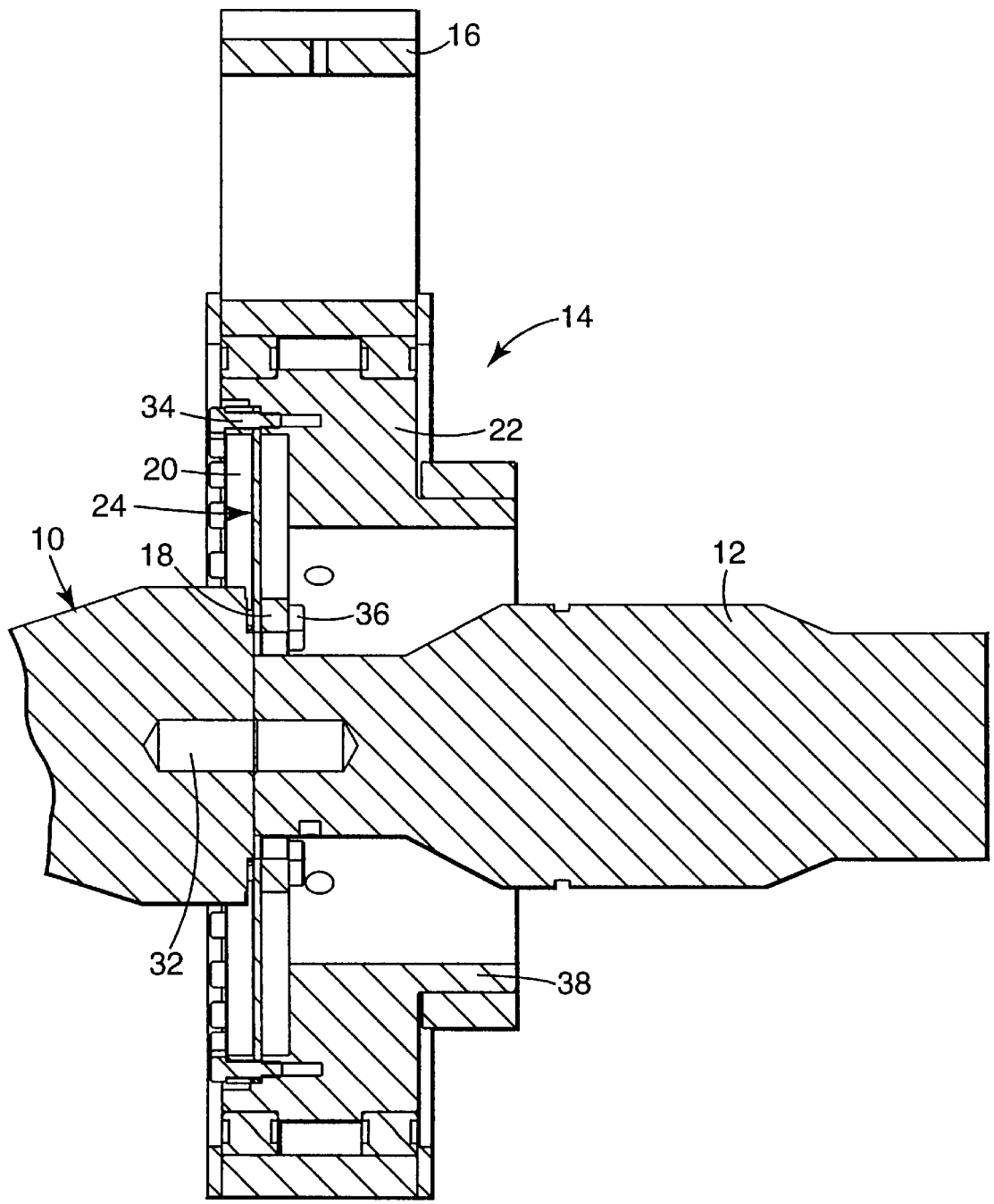
FIG. 4 is a cross-sectional view of the horn mounting system according to one embodiment of the invention showing the drive end of the horn.
Figure 5:
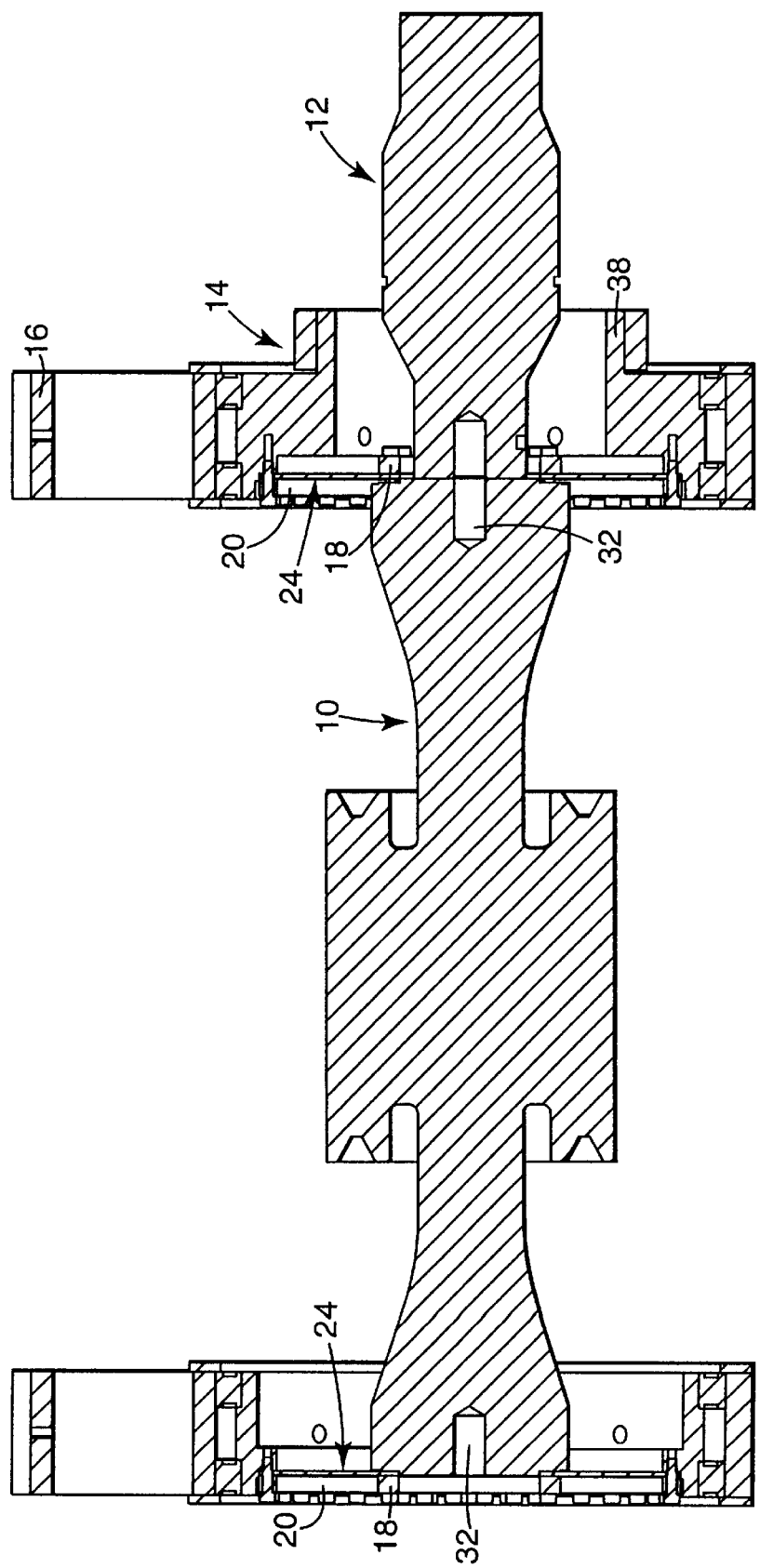
FIG. 5 is a cross-sectional view of the mounting system of FIG. 4 showing the entire horn.
Figure 6:
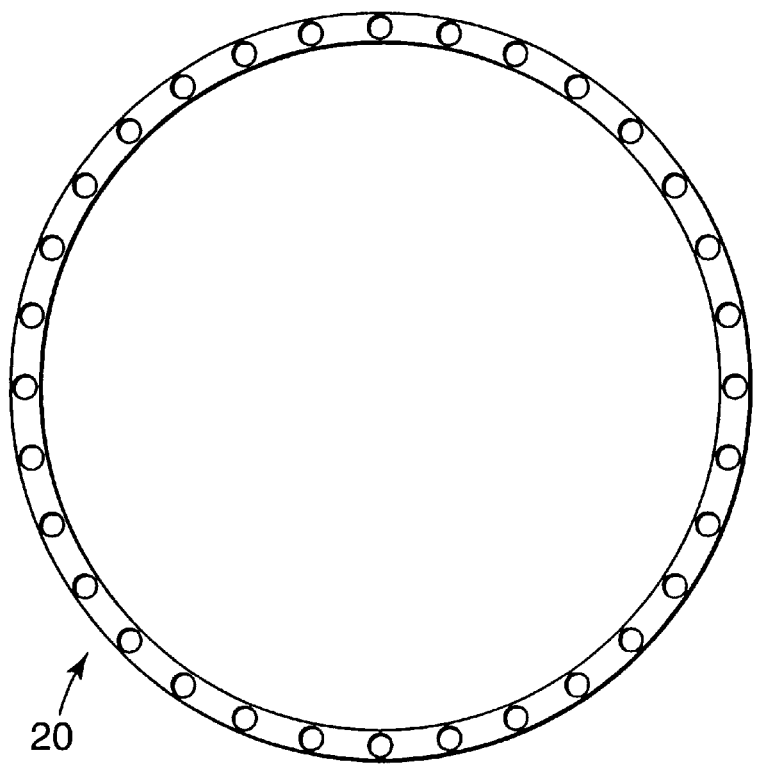
FIG. 6 is a top view of an inner clamp ring used in the mount of FIG. 4.
Figure 7:
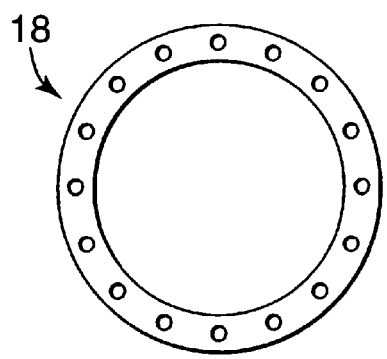
FIG. 7 is a top view of an outer clamp ring used in the mount of FIG. 4.
Figure 10:
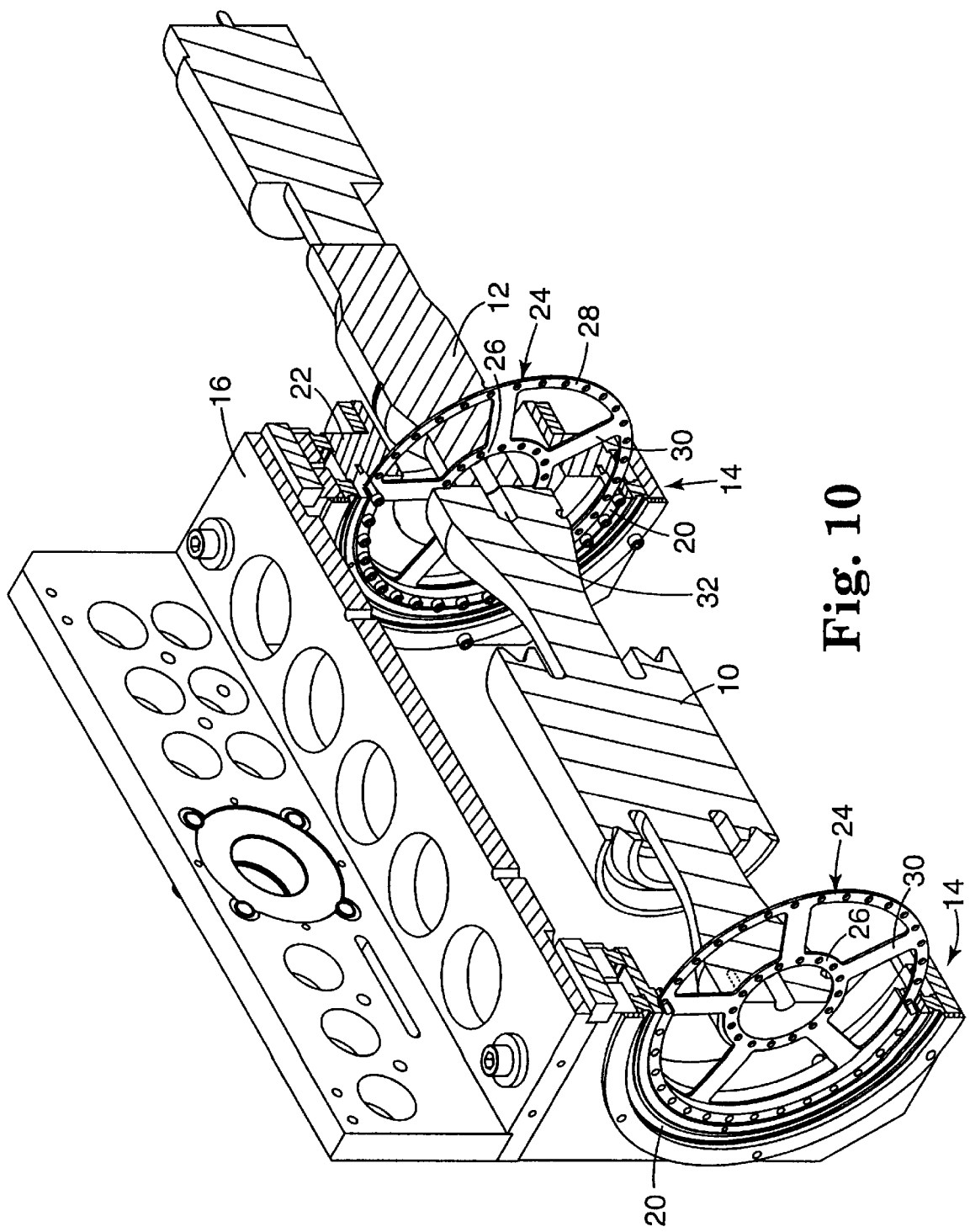
FIG. 10 is a perspective view of the horn of FIG. 4.

FIGS. 4, 5, and 10 show a rotary ultrasonic horn 10 and booster 12 with a mounting system 14. FIG. 4 shows the drive end of the horn. The mounting system 14 includes a non-rotating mounting housing 16, an inner clamp ring 18 (see FIG. 6), an outer clamp ring 20 (see FIG. 7), and a drive ring 22. The drive ring 22 is driven to rotate the horn 10 during operation. The mounting system 14 also can transmit torque to the horn.

Figure 8:
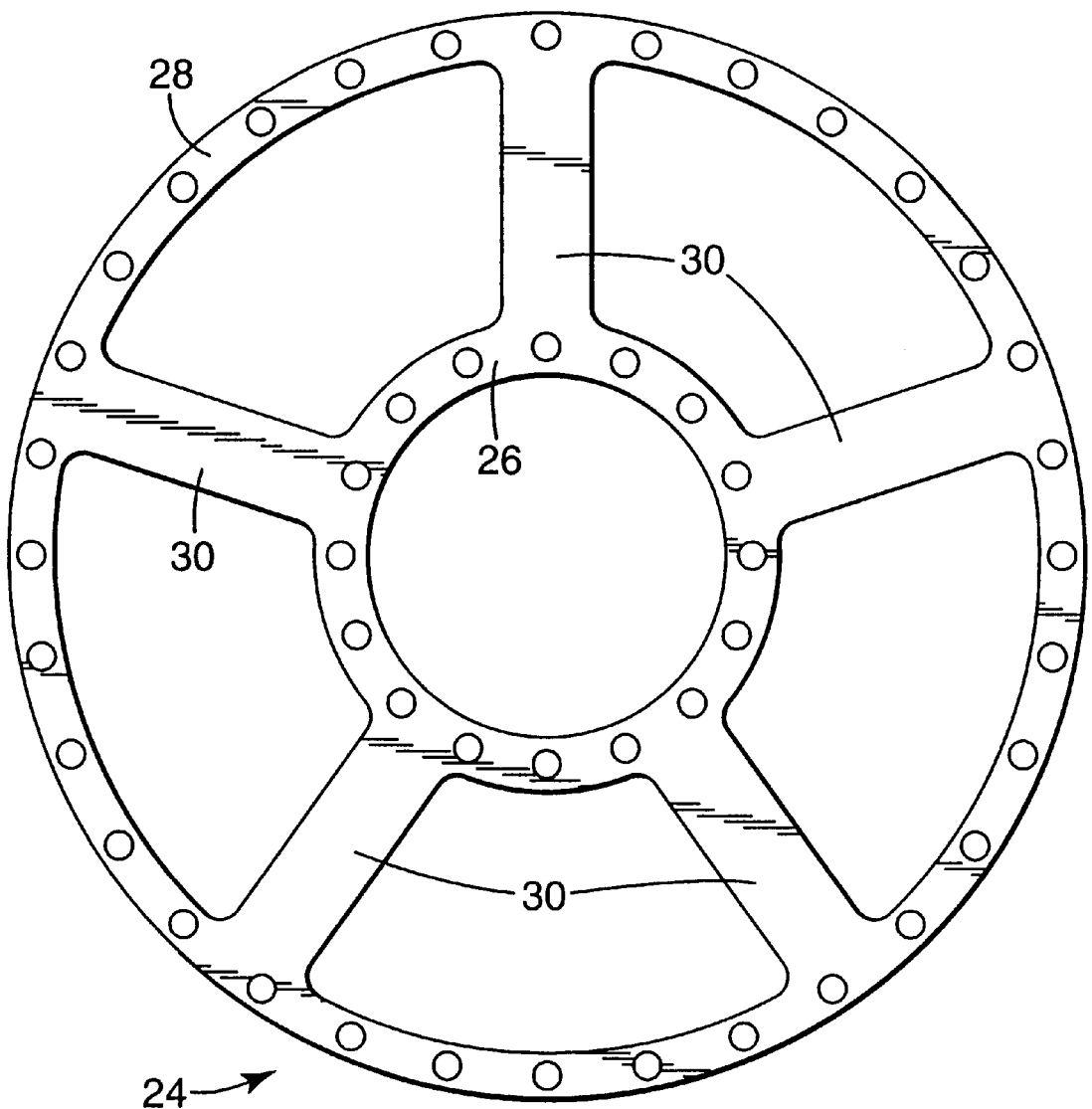
FIG. 8 is a top view of a flex finger disk used in the mount of FIG. 4.

A flex finger disk 24 (see FIG. 8) can include inner and outer concentric annular rings 26, 28 that are connected with five fingers 30, as shown in FIG. 8. Any number of fingers 30 can be used. The fingers 30 can be rectangular, parallelepipedal, cylindrical, straight, curved, angular, or any other shape.

Referring again to FIGS. 4 and 5, the booster 12 is connected to the horn 10 through the use of a threaded stud 32 in a known manner. The flex finger disk 24 is attached to the horn 10. The inner clamp ring 18 is placed onto the flex finger disk 24, and the flex finger disk 24 and the inner clamp ring 18 are fastened to the horn 10 using sixteen #6-32 socket head cap screws 36. The screws can be less than 1.27 cm (0.5 in) apart.

The drive ring 22 is placed on the flex finger disk 24. A bore on the drive ring locates the outer diameter of the flex finger disk 24. The outer clamp ring 20 is placed on the disk 24. Thirty-two #6-32 socket head cap screws 34 are used to fasten the outer clamp ring 20, flex finger disk 24, and drive ring 22 together. Bearings 40 are placed onto the drive ring and the mounting housing is placed on the drive ring. The mounting housing 16 does not rotate. The drive ring provides a point where a timing belt sprocket 38, shown in FIG. 5, can be attached to rotate the horn 10. The non-drive end of the horn 10 is the same except that there is no drive point.

The inner and outer clamp rings 18, 20, respectively, are used to hold the flex finger disk 24 firmly to the horn 10 and the drive ring 22. They are connected to the inner annular ring 26 and the outer annular ring 28 of the flexible disk 24. As shown, the connection is accomplished using screws. This ensures that all of the parts of the disk are in firm contact with the housing 16, prevents sliding motion in the joint, and prevents heating of the flex finger disk 24. This connection could be made in any other known fashion, and these elements could be formed integrally as one piece. If these rings are not stiff enough, then the disk 24 will vibrate between the screws and the mounting will fail. Also, the flex finger disk 24 can be integrally formed as one piece with any of the ultrasonic elements.

The flex finger disk 24 is not sandwiched between the horn 10 and the booster 12 as is done in known non-nodal mounts. When the flex finger disk 24 is placed between the horn 10 and the booster 12 it affects the transmission of ultrasonic vibrations and limits the amplitude of the system. This problem is eliminated with the present invention. Also, the inner bore of the flex finger disk 24 fits over a pilot (round protrusion) on the horn 10. This locates the horn 10 radially allowing quick replacement on the horn. The width, thickness and length of the fingers 30 on the flex finger disk 24 are selected to achieve the following features, and depend on the amplitude and diameter of the drive ring 22. The fingers 30 can be long and slender, and have a length-to-width ratio of from 2 through 10, such as from 2 through 5. The fingers 30 have a width-to-thickness ratio of from 2 through 20, such as from 6 through 10.

The fingers 30 do not have a natural frequency of vibration at or near the resonant frequency of the horn 10. In the current design 20,000 Hz is midway between two natural frequencies of the finger 30. The fingers 30 are as thin possible. In one embodiment they are 0.157 cm (0.062 in) thick. This provides vibration isolation between the horn 10 and the mounting 14. Also, the fingers 30 need to be thick enough to handle the horn/anvil contact forces of up to 2700 N (500 lb).

The maximum stress in the fingers 30 is below endurance limit for the material. The stress in the fingers 30 is based on the amplitude of the horn 10 and the wave shape in the fingers 30 (see FIG. 9). A simple design of the flex fingers 30 would have a wave shape with zero nodes. The stress in the part can be found using textbook solutions for a beam. (The known non-nodal mounts used zero nodes.) Unfortunately, the zero node design is very stiff and transmits excessive displacements back to the mounting. Making the disk 30 thinner results in better vibration isolation and increases the number of wave nodes. As the number wave nodes increases, the radius of curvature of the finger between the nodes decreases. As the radius of curvature decreases, the stress in the fingers rises. The present invention has two nodes. This is a good compromise between isolation and stress in the fingers and differs from the known systems.

This design has numerous advantages. It has a high radial stiffness. This is required so that high forces (greater than 2700 N (500 lbs.)) can be applied between the horn 10 and the anvil roll (not shown). It has a low static stiffness of $9.98 \times 10^5$ N/m (5700 lb/in); sufficiently low for the bearings to handle the static flexible finger load without failure and without a rotating tube (as used in U.S. Pat. No. 3,955,740). It has controlled horn location. This can be done by piloting, a male-female connection, or any other connection between the disk and the horn and the disk and the drive ring. The runout of the horn is controlled by machined components, not adjustment of the mounting. Also, the disk is attached directly to the horn without using elastomeric materials. Elastomeric materials would reduce the radial stiffness of the mounting, make runout control difficult, and absorb energy from the horn vibration, heating and degrading the elastomeric material.

Furthermore, this design allows the horn to be supported on both ends. This dramatically reduces the deflection of the horn relative to a cantilevered mounting, allows the weld surface of the horn to be controlled and remain flat, and allows very high applied loads. Also, the flexible finger disk is not between the horn-booster junction. This avoids interference with the wave front translating across the horn-booster junction. With horns that have a small tuning window, the interference of the fingers with the ultrasonic waves prevents operation of the horn. This is especially true for the higher amplitudes that are required and the higher mass horns.

The flexible fingers must not have a natural resonating frequency near the resonant frequency of the horn. Though the fingers could have any shape, keeping them rectangular allows the use of reference books to find the natural frequencies of the fingers. Finite element analysis (FEA) could be used for other designs.

Figure 9A:
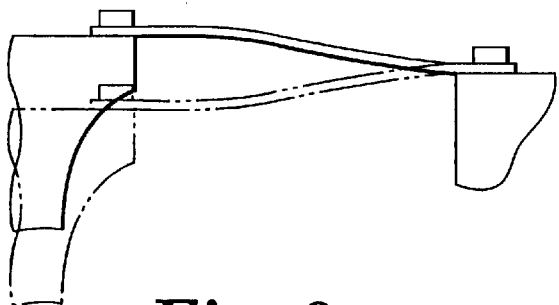
FIGS. 9a, 9b, and 9c are schematic views of the wave shape of the fingers for different numbers of nodes.
Figure 9B:
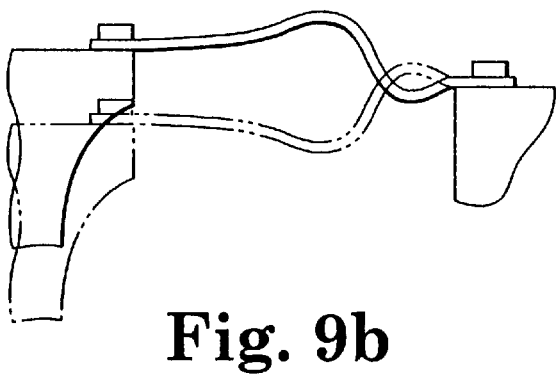
Figure 9C:
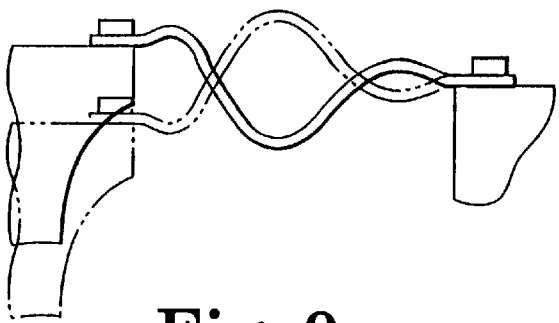

The vibration of the horn generates a forced vibration on one end of the fingers. This motion sends a transverse flexural wave down the fingers much like one would get by shaking the end of a string. The wave shape of the fingers determines the minimum bending radius and therefore the maximum stress in the fingers. The wave shape of the fingers is determined by the material and dimensions of the fingers. FIG. 9 shows the first few possible configurations. The wave shape can be found using FEA or analytical solutions.

The stress in the fingers must be below the fatigue limit of the material. Though any material may be used, alloy steel is currently used.

The illustrated embodiment uses a flexible disk with fingers. This simplifies the analytical portion of the design but is not required. Alternatively, a solid disk, without fingers, can support the horn. In other modifications, damping can be added to the junction between the flex disk and clamp ring and flex disk and drive ring or horn. These materials improve the clamping between the disk and other components. Also, the high damping of these materials further reduces vibration transfers to the ground and reduces the heat build up at the mounting. Damping materials include soft metals, such as annealed soft copper and lead, and elastomers. Also, the disk itself, either the entire disk or only the fingers for example, can be make of a high damping material.

The mount of the present invention improves upon the designs in U.S. Pat. Nos. 3,752,380 and 3,863,826. The invention is usable with rotating horns and the mount is not between the converter and the horn. Thus, there is no interference with the transmission of the energy through the horn.

The mount of the present invention improves upon the design in U.S. Pat. No. 5,468,336 in that the invention is usable with rotating horns and has uniform thickness fingers.

Figure 1:
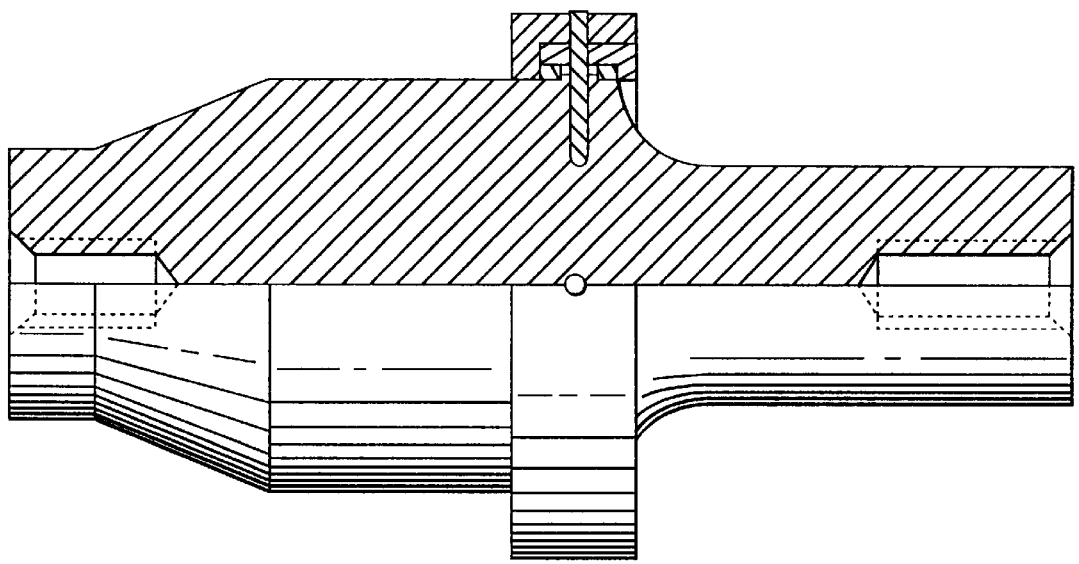
FIG. 1 is a side view, partially in section, of a known horn mount.
Figure 2:
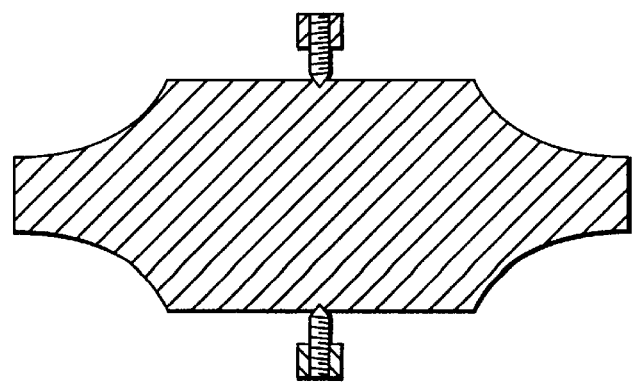
FIG. 2 is a cross-sectional view of another known horn mount.
Figure 3:
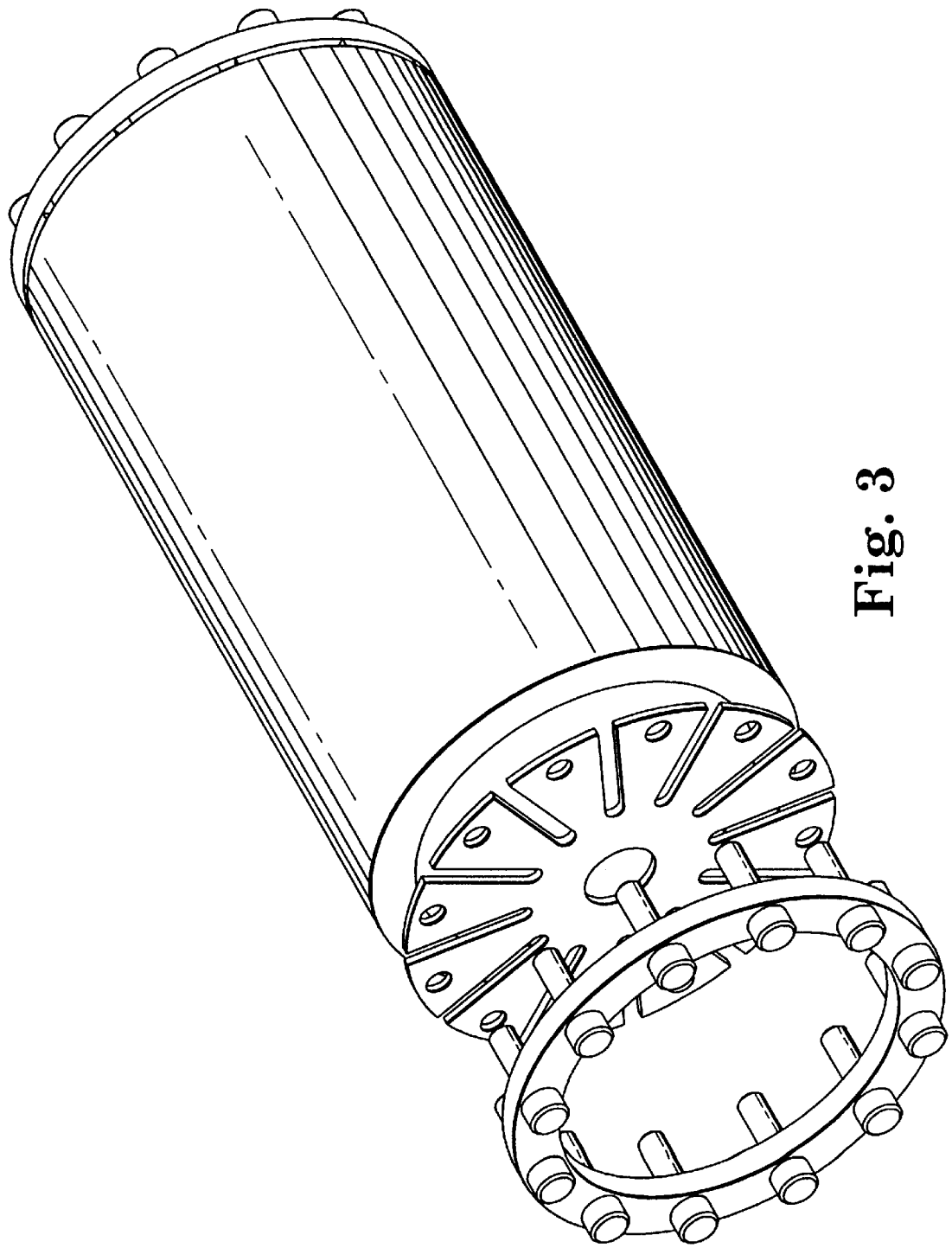
FIG. 3 is a perspective view of another known horn mount.

The mount of the present invention improves upon Amtech mounts (shown in FIG. 3) in several ways. The Amtech design has short (1.27 cm (0.5 in)), thick (0.15 cm (0.06 in)) fingers. This limits the maximum vibration amplitude that the fingers can handle without fatigue failure and transmits higher forces to the fixed members. The invention has fingers that are 3.7 cm (1.45 in) long, 1.27 cm (0.5 in) wide, and 0.16 cm (0.06 in) thick, and has been tested with vibration displacements of 0.005 cm (0.002 in). Moreover, the fingers in the Amtech design are clamped between the horn and the booster. This interferes with the wave front translation across the horn-booster junction. Also, the Amtech design has an even number of fingers. Because an odd number of fingers is used in the invention, no two fingers ever oppose each other. Opposing fingers of the appropriate length can form a simple bar horn which can start resonating at the resonant frequency of the horn. With a fixed outer diameter, this causes large power consumption and very short finger or mounting life (under 60 seconds). The Amtech design is used for a non-rotating booster and the horn is cantilevered.

Another feature of the present invention which distinguishes it from known systems is that the horn, booster, and converter need not be three separate components. The horn and booster can be integrally formed as one piece and the converter can be similarly formed together with the horn and booster. Also, the mounting system can be located at any and many non-nodal locations on the horn-booster-converter assembly.

We claim:

1. A non-nodal mounting system for an ultrasonic element, the non-nodal mounting system comprising:
    a drive ring rotatably connected to one of a mounting housing and the ultrasonic element; and
    a flexible member fixed at an inner portion to the ultrasonic element and at an outer portion to the drive ring, wherein the flexible member comprises means for reducing the force transmitted to the drive ring.

2. The non-nodal mounting system of claim 1 wherein the means for reducing the force comprises fingers shaped to reduce the force transmitted to the drive ring.

3. The non-nodal mounting system of claim 2 wherein the fingers are long and slender, having a length-to-width ratio of from 2 through 10, and a width-to-thickness ratio of from 2 through 20.

4. The non-nodal mounting system of claim 2 wherein the flexible disk further comprises an inner annular ring at the radially inner portion and a concentric outer annular ring at the radially outer portion which are connected by the fingers.

5. The non-nodal mounting system of claim 4 wherein the flexible member is a disk and further comprising an inner clamp ring connected to the inner annular ring of the flexible disk and an outer clamp ring connected to the inner annular ring of the flexible disk.

6. The non-nodal mounting system of claim 1 wherein the ultrasonic element is a rotary horn and wherein the rotary horn is connected to a booster, wherein the flexible disk is located outside of the junction of the horn and booster.

7. The non-nodal mounting system of claim 1 further comprising means for damping vibrations.

8. The non-nodal mounting system of claim 7 wherein the means for damping comprises high damping materials and being located between the flexible disk and the clamp ring and between the flexible disk and one of the ultrasonic element and drive ring, wherein the high damping materials comprise at least one of copper, lead, and high strength elastomeric materials.

9. The non-nodal mounting system of claim 1 wherein the flexible member is a solid circular disk of uniform thickness.

10. The non-nodal mounting system of claim 1 further comprising a rotationally fixed mounting housing.

11. A system for applying ultrasonic energy and a mounting system therefor comprising:
    at least one ultrasonic element;
    a first non-nodal mounting system comprising:
        an annular mounting housing;
        a drive ring rotatably connected to a mounting housing; and
        a flexible member fixed at an inner portion to the ultrasonic element and at an outer portion to the drive ring, wherein the flexible member comprises means for reducing the force transmitted to the drive ring.

12. The system for applying ultrasonic energy and a mounting system of claim 11 further comprising a second non-nodal mounting system located at a second end of the rotary horn.

13. The system for applying ultrasonic energy and a mounting system of claim 11 wherein the ultrasonic element comprises at least one of: a rotary horn; a booster connectable to a horn; and a converter.

14. The system for applying ultrasonic energy and a mounting system of claim 11 wherein the means for reducing the force comprises fingers shaped to reduce the force transmitted to the drive ring.

15. The system for applying ultrasonic energy and a mounting system of claim 11 further comprising a rotationally fixed mounting housing.

* * * * *

UNITED STATES PATENT AND TRADEMARK OFFICE
CERTIFICATE OF CORRECTION

PATENT NO. : 5,976,316
DATED : November 2, 1999
INVENTOR(S) : John R. Milinar and Donald S. Oblak It is certified that error appears in the above-identified patent and that said Letters Patent is hereby corrected as shown below:

Title page,
Under "References Cited", insert the following;
-- Foreign Patent Documents
WO 97/34728  9/25/97 PCT --.

Column 7,
Line 32, claim 4, "disk" should read -- member --.
Line 38, claim 5, "inner" should read -- outer --.
Line 42, claim 6, "disk" should read -- member --.

Column 8,
Line 5, claim 8, "disk" should read -- member --.
Line 6, claim 8, "disk" should read -- member --.

Signed and Sealed this

Thirtieth Day of October, 2001

Attest:

*Attesting Officer*

NICHOLAS P. GODICI
*Acting Director of the United States Patent and Trademark Office*